United States Patent Office 3,016,327
Patented Jan. 9, 1962

3,016,327
BIOCIDAL COMPOSITION AND METHOD
Robert A. Schmitz, Greenwich, and Arnold F. Anderson, 29 Putnam Park, Greenwich, Conn., assignors, by direct and mesne assignments, of one-fourth to said Anderson and three-fourths to said Schmitz
No Drawing. Filed Dec. 12, 1955, Ser. No. 552,254
6 Claims. (Cl. 167—22)

This invention relates to a germicidal composition and method and contemplates, among other embodiments, solid or liquid soap compositions including therein, as the activating germicidal principle, colloidal particles of an alkali-activated or basic anion exchange resin.

The invention also relates to biocidal compositions and aqueous solutions, in which the biocidal effect is achieved by the combination of a basic-reacting salt or basic buffer composition, together with colloidal particles of an alkali-activated or basic anion exchange resin.

This application is a continuation-in-part of a copending application, Serial Number 197,499, filed November 24, 1950, for a Germicidal Soap Composition, and a second copending application, Serial Number 155,368, filed April 11, 1950, for Resin Base Germicidal Composition and Method both now abandoned.

Germicidal soaps and similar compositions in use heretofore have generally relied for their germicidal properties upon a mercurial compound, a phenol or phenol derivative, or, more recently, upon halogenated dihydroxy diphenyl methanes, incorporated in the composition in germicidal proportions.

The application of ion exchange resins towards biocidal purposes, in general, is not broadly new. However, in the past there has always been some form of combination with the resin of an oligodynamic, precipitated metal, or an electric current, and the biocidal efficiency has always been directly proportional to the properties or quantity of the oligodynamic metal or the electric current.

A broad object of this invention is to provide improved biocidal compositions effective in small concentrations and not dependent for their efficacy on oligodynamic metals or electric current and having a biocidal effect when incorporated in detergents, cosmetics, deodorants and the like.

A further object is to provide an improved germicidal soap composition in liquid or solid form for general washing or toilet purposes.

Conforming to such broad object we provide biocidal compositions and solutions whose activity derives from the presence of a combination of an alkaline compound, such as a salt, and colloidal particles of a basic anion-exchange resin. The alkaline compound or salt may be the alkli metal salt of a fatty acid, such as the common soaps.

A further object of the invention is to provide such an improved germicidal soap composition which contains only minor amounts of the activating principle and which is free from any characteristic odor, taste, or sensation to animal tissues attributable to the activating principle.

These and other objects of the invention are achieved by incorporating a small amount of a basic anion exchange resin such as an alkali-activated anion exchange resin, in the form of porous, colloidally-sized particles, in an alkaline-reacting medium, for example, with a basic material or a material hydrolyzable in aqueous medium to form alkaline-reacting aqueous media. The alkaline-reacting component may be basic or may derive its basic hydroxyl ions from a salt of a strong base and weak acid which upon hydrolysis furnishes an excess or hydroxyl ions. A standard soap composition comprising an alkali metal salt of one or more higher fatty acids admirably serves as the alkali-reacting component. While such a combination may appear, on its surface, to be a relatively simple formulation, the results obtained in germicidal kills and in germicidal retardation are unexpected, are unpredicatable on the basis of the individual components, and are far superior to germicidal compositions hitherto available. In addition, the composition is free from corrosive characteristics, does not irritate tissue, will not discolor media, and is chemically stable. Biocidal activity is exhibited which is effective against natural protein substance, whether bacterial, viral, vegetative, or genetic. Similar germicidal results are obtained by the suspension in water of a composition including like amounts of the basic anion exchange resin with a strongly basic salt or mixture of basic compounds, such as the common basic buffering mixtures, or basic salts. Among the strongly basic substances, for example, which may be employed, are trisodium phosphate, sodium carbonate, and disodium phosphate, to name only a few. In general, suitable strongly basic salts include the hydrolyzable alkali metal salts of weak acids.

While a theoretical explanation for the efficacy of the composition has been developed, it should not be considered as binding, since further research may evolve a more precise explanation of the actual kill mechanism. On the basis of present knowledge, the composition of this invention appears to create a biocidal sphere of action in the proximity of each porous, colloidal resin particle, adjacent the reactive ionic interface between the solid-colloidal resin phase and the liquid (aqueous) phase. Within such a biocidal sphere, Van der Waals forces acting between a microorganism and the anionic colloidal resin particle are supplemented by ionic or chemical forces, which combine to induce germicidal reactions. These reactions cause a destructive partial biolysis to occur to the microorganism, which is supplemented by a terminal adsorptive germicidal reaction upon further proteolysis proximal to the solution surrounding and within the porous colloidal resin particle. This adsorptive terminal reaction occurs between (1), reactive polar groups of the hydrolyzed peptide chains and/or amino acid products of the microorganism protein substances, and (2), the porous, colloidally dispersed particle of the basic hydroxyl ion exchange resin.

A single microorganism in an equeous medium of approximately neutral pH, before being subjected to a killing treatment according to this invention, may be considered as semi-motile, as well as subject to Brownian movement. It can be considered to be hydrated, at least initially. The nuclei of its cells are dynamic, and it possesses unequally distributed surface charges. To the medium containing this microorganism, there may be added a germicidal composition according to this invention, comprising, for example, a soap containing porous, colloidal particles of a basic anion exchange resin. In the aqueous medium, the addition of the germicidal composition produces a heterogeneous mixture in which each porous, colloidal particle of resin is surrounded by, enveloped in, and permeated with a solution composed of hydrolyzed micellar (normal) soap, dissociated so as to constitute a weak electrolyte buffering solution, the whole being suspended in the aqueous vehicle. In effect, each porous, colloidal particle forms the center of a biocidal sphere, in which the porous colloidal resin particle is surrounded by and permeated with a film of soap solution. Since each biocidal sphere is of approximately colloidal size, the distribution of the biocidal spheres in the medium is widespread, offering ample opportunity for contact with the microorganism.

If the porous resin particles were large, the particles would tend to settle out from an aqueous suspension, under ordinary gravitational forces. However, in the case of colloidal particles, those below four microns in diameter, the Brownian movement is exhibited and its effect largely negatives the effect of gravity, so that gravitational settling is negligibly slow. Where the alkaline-reacting salt is possessed of emulsifying or suspending properties, as is soap, and as are basic (alkaline) compositions containing synthetic detergents, the suspension of the colloidal resin particles is very stable. Since many organisms are also subject to the Brownian movement, there is a natural tendency for the resin particles to come into close proximity with the organisms, especially in a well-mixed, homogeneous system.

In due course, under the influence of kinetic effects and unevenly distributed surface charges, the microorganism will collide with the outer boundary of a biocidal sphere, making contact with the solution of hydrolyzed soap. Upon becoming spatially located within the boundary of the biocidal sphere, in contact with the soap solution, the hydrated microorganism comes into contact with ions in that solution which promote biolysis. A possible explanation for this occurrence is that the microorganism, after its entry into the biocidal sphere, may be considered to be in a basic solvent, in which solvation of any protons in the microorganism's cells is materially increased. This causes an apparent increase in strength for the ionized acid groups, and in the activity coefficients of the ions present within the hydrated microorganism. The hydroxyl ions present in the soap solution thus promote a partial biolysis, leading to the destructive reactions and adsorption transformations of the microorganism under the influence and in combination with the colloidal resin particle.

Concurrently, because of the alkaline nature of the soap solution, the total net charge on the surface of the microorganism becomes such that the microorganism may be considered as a negative ion, $M^-$. Alternatively, considering the destructive partial biolysis as productive of a specific hydrolyzed protein peptide or amino acid, the negative particle could be presented as $$R.CNNH_2COO-$$

or $$M.RCHNH_2COO-$$

At this point, the basic substance, soap, in effect takes up a proton from the progressively biolyzing proteinaceous substances, and also from any hydrolyzing amion acid residues present, according to the following probable reaction:

$$R{-}\underset{\displaystyle COO^-}{\underset{|}{CH}}{-}NH_3^+ + OH^- \longrightarrow R{-}\underset{\displaystyle COO^-}{\underset{|}{CH}}{-}NH_2 + HOH$$

The substance first shown is dissociated peptide at the iso-electric point or a hydrolyzing amino acid residue ($M\pm$). The hydroxyl ions are furnished by the alkaline-reacting component. Under the influence of net predominating Van der Waals forces, the microorganism protein substance is then caused to precipitate electrophoretically on the colloidal particle of anion exchange resin. At the same time, salt formation is promoted with the microorganism and/or residues ($M^-$) by the strongly basic medium permeating the entire area.

Within the biocidal sphere, there appears to be a concentration gradient of the soap solution, with the concentration increasing inwardly from the periphery of the sphere to and into the porous colloidal particle. The movement of the microorganism toward the colloidal particle thus subjects the microorganism to the influence of hydroxyl ions in increasing concentration, promoting proteolysis.

By virtue of the surface active properties of the soap solution, interfacial tension between the membranes which protect the protein substances of the microorganism and the soap solution itself is overcome. This promotes the ultimate diffusion of the microorganism protein substances as reactive polar groups or dissociated ions, and their adsorption by the colloidal resin particle. This diffusion and adsorption process is believed to occur within a radial proximity of the colloidal resin particle within which the attractive forces of active ionic bonds of the colloidal resin particle which are capable of exchanging hydroxyl ions germicidally with the polar groups of the microorganism can be caused to react.

The effectiveness of the soap solution may be attributed to its ability to preserve electroneutrality across the membrances of the microorganism protein substances and the colloidal resin particles, which allows completion of the germicidal action. This involves the terminally destructive proteolysis and loss of essential cell contents, and the formation of adsorption compounds and organic protoplasm residues.

Considering more specific aspects of the invention, soap compositions of all types are contemplated. The term "soap" is employed in its ordinary meaning, referring to cleansing agents made by the reaction of a caustic alkali on fats or fatty acids. Such a soap will ordinarily comprise the sodium or potassium salts of fatty acids, both saturated and unsaturated. A typical commercial soap, for example, might comprise the sodium salts of lauric, oleic, myristic and stearic acids, in combination with other materials of no essential importance to the germicidal mechanism, such as: rosin filler, perfume, emollients; builders such as sodium sulfate, potassium sulfate, or similar materials; and modifiers, such as certain of the synthetic detergents. The soap may be in a liquid or solid state.

The above explanation of the probable mechanism of the germicidal properties of the compositions is theoretical and represents the hypotheses of the inventors and their best thinking at present. This explanation, of course, is not binding on the inventors in any way, and is described in an effort to explain and clarify the background for the unusual and unexpected results obtained through the use of the claimed compositions. This explanation has been made in terms of the use of soap as the alkaline component of the composition. However, it will be readily understood that this explanation is equally applicable where the alkaline or strongly basic component is a salt or mixture of salts, such as, for example: sodium carbonate; a mixture of sodium hydroxide and sodium carbonate; a mixture of sodium carbonate and sodium bicarbonate; trisodium phosphate; disodium phosphate; a mixture of disodium phosphate with trisodium phosphate; and other common alkaline salts and mixtures of salts, particularly buffering salts and mixtures of salts which will maintain the pH in the alkaline range, and preferably above 7.4.

As to the resins which may be employed, a number of alkali-activatable anion exchange resins may be used. However, the preferred resin is a urea-guanidine-formaldehyde condensation product, which may be prepared according to the following general reaction:

$$X(NH_2{-}\underset{\displaystyle O}{\underset{\|}{C}}{-}NH_2) + X(NH_2{-}\underset{\displaystyle NH}{\underset{\|}{C}}{-}NH_2) + y(CH_2O) \xrightarrow{HCl}$$

$$H(OCH_2NH\underset{\displaystyle NH}{\underset{\|}{C}}NHCH_2OCH_2NH\underset{\displaystyle O}{\underset{\|}{C}}NHCH_2O)_xH$$

Such resins are of a type which is recognized and well known in the art. Reference may be made, for example, to the two Swain patents, 2,251,234 and 2,285,750, and to the Barnes Patent 2,434,190. In any such resin, the molecular weight will depend, in each instance, on the degree of condensation and cross polymerization. In general, differences in the molecular weight (size) of resins are not critical, except that the resin should be particulate and the particles must be colloidal in size.

Several preferred types of anion exchange resins have been produced and incorporated into effective germicidal compositions. Although guanidine-urea-formaldehyde anion exchange resins are particularly preferred, the various other types of alkali activatable anion exchange resins may be employed according to this invention. Such a preferred resin may be alkali activated by treatment with a 10% solution of sodium carbonate. Any of the other conventional activating bases or alkaline salt solutions known and used in the ion exchange art may be used, such as sodium hydroxide, ammonium hydroxide, trisodium phosphate, sodium bicarbonate, disodium acid phosphate, etc. A very important feature is the reduction of the resin to colloidal size in order to apply the colloidal properties of the system effectively by permitting dispersion and subsequent colloidal phenomena to transpire between microorganisms and the germicidal composition, whereby the vital polar groups are intimately exposed.

A distribution of about 2% by weight of the colloidal particles of rsein in soap is a preferred germicidal composition for a germicidal soap. This is an economical formulation in which a very small amount of the resin is employed, with the attendant manufacturing savings. However, germicidal activity is exhibited with even lower percentages of resin particles, such as ½% to 1% by weight of the soap. Similarly, no upper limit on the resin content is indicated, so that, for practical purposes, in most applications, a 2% resin content is equally as effective as a 10% resin content.

While the soap will normally be a heterogeneous mixture of oleates, stearates, myristates, etc., the soap, in solution, may be simply represented by the indication $C^+A^-$ where C represents a positive ion such as $Na^+$, $A^-$ represents a negative ion of a weak acid, such as the oleate ion. In solution, soap will dissociate according to the following:

$$CA \text{ (excess)} + C^{+++}A^- + HOH$$
$$= HA + C^{+++}OH^- + CA \text{ (excess)}$$

These ions will be freely available in the miscellar colloid which is formed upon mixture of the soap with water, and its subsequent hydrolysis, with the hydroxyl ions having high activity.

Upon contact by a microorganism with the soap solution, partial destructive biolysis occurs, with the chief reaction being proteolysis. The microorganism protein substances contain sulfur bearing amino acids having reactive sulfur bonds. Typical sulfur bearing amino acids are:

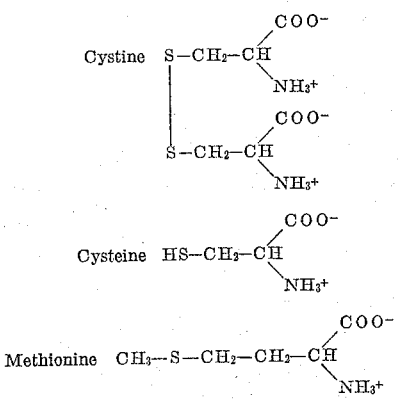

The ultimate microorganism killing reaction probably involves an attack on the sulfur bonds, at a cross link in the polypeptide chains in the microorganism protein substances, with hydrolysis occurring. Considering cystine, for example, either as the free amino acid hydrolyzed from a peptide group, or as a part of a peptide chain, hydrolysis would occur according to the following diagrammatic representation:

$$CyS-SCy + 2HOH \rightarrow 2CySH + 2OH^-$$

Base exchange at the colloidal particle of anion exchange resin would then occur, as follows:

$CySH + OH^-$ (hydrolysis product of microorganism peptides) $+HA + C^+ + OH^-$ (dissociated soap in solution) $+RNH_2HOHHOH$ (hydrated alkali activated anion active resin) in the presence of water and an excess of soap $(CA) \rightarrow CyOH$ (protoplasm peptide organic residue) $RNH_2-SHH_3O$ (adsorption compound)

$$+C^+ + A^-HOH$$

This is merely one of several reactions which could be occurring. Actually, the kill obtained is so extremely high as to indicate the presence of some activity which cannot be explained on a stoichiometric basis. Indeed, the partially biolyzed microorganism protein substances, as well as the biocidal soap compositions, are colloidal dispersions, and the biocidal changes which occur may be chemical reactions, or adsorptive changes taking place through colloidal interactions and transformations, or some combination of each of these.

Another possible representation of the action of the anion exchange resin is as follows:

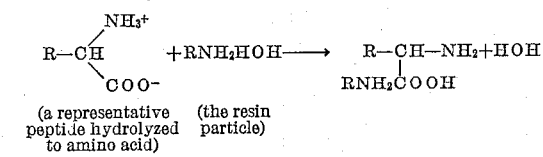

This reaction merely indicates the possibility of salt formation by acid removal with the alkali activated anion exchange resin, which would be possible in the presence of the soap solution. The soap solution would function to permit proteolytic adsorption by preserving electroneutrality and effecting or (catalyzing) the hydrolysis of the microorganism polypeptides or protein substances. In so doing it can take on a proton from the progressively biolyzing protein substances and amino acid residues initially, and subsequently, it promotes neutralization of the residues to effect salt and water formation.

Soap compositions made according to this invention may be added directly to a contaminated aqueous solution by sifting, milling, beating in, etc., of the solid soap, or by stirring particles in aqueous or alcoholic germicidal soap suspension into the contaminated aqueous solution. The soap is also useful for cleansing living tissue, and when used for washing the hands or underarm areas, decreases the bacterial count drastically. Continued use maintains the bacterial count at a low level. The soap compositions are also effective in removing microorganisms from hydrated colloidal suspensions of various types. The germicidal soap compositions may also be employed in a dentifrice composition, in an agricultural seed sterilizing and protecting composition, and in a composition useful in counteracting and minimizing food-borne infections and intoxications in the food processing and preservation industries. These compositions may also be employed in the manufacture of leather goods, paper, rubber, etc. Similarly, application of a soap solution made according to this invention to inanimate objects is very effective in reducing the bacterial count.

Still other end uses contemplated in connection with the invention herein described reside in improving soluble cutting oil compositions. Addition of the composition herein described and claimed will function to free the oil of the adverse effects normally attributable to the known presence of microorganisms in the oil and in that way render more sanitary conditions surrounding the operation of machine tools, etc. wherein such cutting oils are constantly present. Use of this improved germicidal composition with serums will function to sterilize and preserve the same, free from the sensitivity reactions and other adverse effects attributable to the presence of phenolic or heavy metal ion germicides and preservatives now customarily used. Use of our improved germicidal composition in connection with water paints is also contemplated.

The invention may be further illustrated by several specific examples. Example 1 relates to a germicidal soap composition and its preparation.

Example 1

A soap was prepared by saponifying a mixture of fatty material comprising approximately 75% tallow and 25% coconut oil with caustic soda. The soap thus obtained contained the sodium salts of higher fatty acids, with major amounts of the laurate, oleate, myristate and stearate salts, and minor amounts of other salts. This soap was solidified and formed into dry chips.

A resin was then prepared from urea, guanidine, and formaldehyde, so as to conform as a condensation product to a multiple of the empirical formula

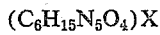

$$(C_6H_{15}N_5O_4)X$$

where X is large enough to provide a molecule which is of colloidal properties and dimensions, at least. This resin was cooled, gelled, then solidified and ground into particles of colloidal size. It was activated with a solution of sodium carbonate before grinding.

Referring to the preparation of the resin more specifically, 28 parts by weight of sodium carbonate and 415 parts by weight of formaldehyde C.P. were introduced into a reactor having an electric stirrer and a reflux condenser. With the stirrer agitating the contents of the reactor rapidly, a mixture of 104 parts by weight of guanidine nitrate and 96 parts by weight of urea was added. The mixture was gradually heated to reflux temperature, in the vicinity of 90° C., with care being taken that all of the solids were dissolved before the temperature was allowed to rise above 50° C. After maintaining the mixture at reflux temperature for 5¼ hours, the mixture was allowed to return to room temperature. A pH of 8 was observed in the reaction product.

The reaction product was then transferred to an open vessel, and the temperature was brought to just under 90° C., while the reaction product was subjected to constant agitation. The heated reaction mass was then acidified with dilute hydrochloric acid (15% to 20%) to a pH of 4.0. After careful mixing, the agitation was stopped. The mass was then slowly cooled, and at about 70° C., gelatinization began. At room temperature, gelatinization was complete. The gelatinized mass was comminuted into particles of approximately 8 mesh. The granules were oven dried at 55° to 60° C. for 6 hours, then at 100° C. for 1 hour.

The dried granules of resin were then ground, alkali activated, and micropulverized. The particles were ground to a powder, then treated with an activating alkaline solution. This solution was prepared by dissolving 46 parts by weight of anhydrous sodium carbonate in 414 parts of water to yield an approximately molar solution of sodium carbonate. With this solution at room temperature, it was agitated with 100 parts by weight of the powdered resin for approximately one-half hour. The resin was then separated by filtration, washed with 50 to 100 parts of water, and dried at about 55° C. for a brief period, with a gradual increase in temperature to 110° C.

The dried, alkali-activated resin was then passed through a Micro-Atomizer. The resulting particles were predominantly smaller than 4 mu (four one-thousandths of one millimeter in diameter). Other pulverizing techniques producing satisfactory particles may be employed.

Seven pounds of dry soap chips, containing approximately 10% water by weight, were mechanically mixed with 1% by weight of the resin in the form of particles of colloidal size, in the presence of an additional 4% by weight of water. This mixture was passed four times on a three roll mill until no white specks were visible. The mixture was then passed through a plodder and the finished cakes were pressed on an automatic press to form cakes of soap.

Several cakes of soap were made up in this manner and were used in residual hand washing tests to determine the effectiveness of the bactericidal action of this new germicidal soap. In these tests, no control was employed. The method of testing was Cade's modification of the multiple-basin technique of Phillip B. Price "The Bacteriology of Normal Skin; A New Quantitative Test Applied to a Study of Bacterial Flora and the Disinfectant Action of Mechanical Cleansing," Journal of Infectious Diseases, volume 63, pages 301–318 (1938). The method used in this test was "Evaluation of Antiseptic Soaps," Arthur R. Cade, Soap and Sanitary Chemicals, June 1950, page 92.

For the purpose of this test, six human subjects were used and the test was continued for two weeks. During this time the subjects used our improved soap composition exclusively for washing their hands. The resident bacterial population of the hands of each subject was determined at spaced time intervals during the duration of the test. This was done by having each subject wash his hands with the germicidal soap, prepared as above, containing 1% of the alkali activated anion exchange resin. The washing was done in five basins consecutively, each basin containing one liter of water, and the bacterial count was then determined on the first, fourth, and fifth basins. The counts were made in tryptone-glucose extract agar.

The results obtained showed that there was approximately an 82% reduction in the resident bacterial population of the hands after ten days' use of the soap, thus clearly establishing the germicidal properties of the composition.

The subjects used in testing by this multiple-basin technique ceased using the germicidal soap and used no other antiseptic soap for a period of ten days thereafter. Ordinary toilet soaps were employed. The toilet soap provided which was used during this ten day period was Lux Toilet Soap purchased on the open market. At the expiration of the ten day period, bacteria counts on five of the six subjects had risen on the average to only 75% of the original count as taken at the beginning of the test, prior to any washing with the improved germicidal soap composition.

These results indicate that use of this germicidal soap composition resulted in a distinct residual bactericidal action. It can be assumed that, subsequent to washing, a residue of the new germicidal soap remains in a film on the hands. This probably accounts for at least some of the residual bactericidal action.

Perspiration which accumulates on the skin is normally composed of water and animal protein, etc., on which bacteria normally thrive. The presence of water in the perspiration as well as the presence of the film of the germicidal soap composition would once again kill resident bacteria, or would affect the animal proteins in such a manner as to make them no longer a source of nutrient for the bacteria. In other words, the germicidal soap is a bactericidal metabolite antagonist.

The steps set forth above were repeated where the resin employed was prepared with the substitution of 77 parts of guanidine carbonate for the 104 parts of guanidine nitrate previously employed. Substantially identical germicidal results were obtained. This procedure was also repeated by incorporating the fine resin particles in several other commercial soap stocks, with the soap stock itself being employed as a control. In each case, very satisfactory biocidal results were obtained with the soap compositions containing the anion exchange resin particles distributed therein. The commercial soap stocks tested in this way included the following soaps which were purchased on the open market: Ivory Snow; Ivory cake soap; Colgate bulk stock soap chips; Rinso; Davies Young Soap Co. soap stock; Lever Bros. Lifebuoy cake stock; and Jergens' Woodbury's soap stock.

As a precaution, the resin prepared was carefully tested to determine its possible toxic effects on animal life. Corneal scarification tests with the resin indicated that it was not harmful to sensitive tissue. Acute toxicity tests on small mammals, employing intravenous injection, indicated that the MLD for a human of 60 kg. body weight would be approximately 15 gr. Skin patch tests using wet gauze pads impregnated with the resin particles revealed no irritation after a 24 hour contact period.

*Example 2*

Using the techniques and following the method described in Example 1, several cakes of soap were produced containing 2% by weight of the resin specified in Example 1. Several tests were conducted to determine the bactericidal effectiveness of this germicidal soap composition.

This soap composition was tested against underarm bacteria by the swab method, and the results were compared with identical tests in which ordinary soap was employed as a control. In this test, two subjects were chosen, and bacteria counts under each arm were made at the start of the test and on each following day for five consecutive days. These subjects washed each day under the left arm with the germicidal soap manufactured as above, having thoroughly dispersed therein 2% by weight of active anion exchange resin. The subjects also washed under the right arm with a conventional soap employed as a control. In this case, the control soap was Lux Toilet Soap.

At the beginning of the test, the bacteria count of the subjects washing under the right arm with the control soap was 73,000 and 64,000, respectively, and on the fifth day the bacteria count was 80,000 and 40,000 respectively, showing complete bactericidal ineffectiveness. The bacteria count at the start of the test under the left arm of the subjects, where the germicidal soap was employed, was 84,000 and 96,000, respectively, this count being reduced on the fifth day after use of the germicidal soap to 700 and 900, respectively.

It is thus evident that the bacteria count was effectively reduced through the use of the improved germicidal soap. By comparison, the effect of the soap employed as a control was negligible insofar as germicidal characteristics are concerned.

Residual hand washing tests were conducted using soap having thoroughly dispersed therein 2% of the activated anion exchange resin prepared according to this example. In these tests, five people were used for testing the germicidal soap, and two people utilized a conventional soap for control purposes. Hand bacterial counts were made before the start of the test, and counts were then made for twenty-two days, during which time the subjects used only the soap assigned and no other. The method used was simply a washing of the hands in the designated soap immediately before taking the bacterial count. A tap water rinse was used up until the fourteenth day, after which sterile water was used. The count was taken by pouring 10 cc. of sterile water into the hands, then pouring it off into a tube. One cc. of this effluent was properly diluted and plated. While the control samples showed only an irregular count with sporadic reduction and increase, samples taken after the use of the germicidal soap composition showed an extreme reduction, the count in general being reduced to approximately 6.52% of the original count before the beginning of the test.

*Example 3*

While the previous examples have been primarily directed to germicidal soap, where the word "soap" has referred to a fatty acid soap of an alkali metal, the invention is more broadly applicable. Thus, for example, many so-called "soap" preparations on the market today include in their composition synthetic detergent materials. These materials may be present in proportions which vary from very minor proportions to major proportions. The germicidal effects derived from the present invention have been found to be obtainable with many types of synthetic detergent materials provided that the essential alkaline (basic) compound is present so as to maintain the pH of the final heterogeneous solution, at least within the biocidal sphere in which the killing is to take place, above 7.0 and preferably above 7.4.

The germicidal effects of the invention are obtainable when the colloidal particles of the basic anion exchange resin are mixed with the alkaline compound and with an anionic or a non-ionic synthetic detergent.

In the present example, the general procedure of Example 1 was followed, and seven pounds of dry sodium dodecyl sulfate were mechanically mixed with 25% (by weight of the synthetic detergent) of sodium bicarbonate as the alkaline salt, together with 1% of particles of the resin employed in Example 1, ground to a size where the largest particle had a diameter no larger than four one-thousandths of one millimeter, and an additional 4% (by weight of the detergent) of water to facilitate mixing. This mixture was passed over a three roll mill to obtain complete mixing, then through a plodder, and finally was pressed on an automatic press to form a detergent cake.

Tests conducted with this detergent cake indicated that it had a germicidal efficiency comparable with the germicidal soap composition prepared in Example 1. It was therefore far superior to ordinary toilet soap preparations.

Following the same procedure, effective germicidal compositions may be prepared in which the synthetic detergent material is an alcohol sulfate such as Duponol W. A., $C_{12}H_{25}OSO_3Na$; alkyl aryl sulfonates such as Santomerse D, $C_{12}H_{25}(C_6H_4)SO_3Na$; alkyl sulfonates such as Merpols B and C, $RCH_2SO_3Na$; sulfated, sulfonated amides, such as Igepon T, made by the condensation of oleyl chloride with methyl taurine; sulfated, sulfonated esters, such as Igepon AP, $RCOOCH_2SO_3H$, where R is $C_{12-18}$; sulfated and sulfonated amines. In addition, other miscellaneous types of anionic detergents may be employed, such as the Triton series, typified by the general formula sodium alkyl aryl polyether sulfonate; the Aerosols, and many others. Among the non-ionic surface active agents which may be employed in producing germicidal compositions according to the teachings of this invention, there may be mentioned such compounds as dodecaethylene glycol monolaurate, monooleate, monoricinoleate and many others.

A great many alkaline compounds (basic-reacting compounds) may be employed in connection with the synthetic detergents in order to create and maintain the proper pH within the biocidal sphere which induces proteolysis. Typical of such basic materials are ordinary soluble, hydrolyzable soaps having the proper pH characteristics, and such standard buffers as a mixture of sodium hydroxide and sodium carbonate, sodium carbonate alone, a mixture of sodium carbonate and sodium bicarbonate, trisodium phosphate, a mixture of disodium phosphate with trisodium phosphate, and other common alkaline buffering salts and mixtures of salts which will maintain the pH in the alkaline range, and preferably above 7.4.

*Example 4*

An equally effective heavy duty cleanser was prepared by admixing 1 part by weight of the resin particles prepared as in Example 1, with 99 parts by weight of trisodium phosphate. The resulting mixture was homogeneous and was dried in granular form. When made up into a dilute aqueous solution, the cleansing action of the trisodium phosphate, coupled with the biocidal characteristics of the composition, produced an excellent combination of properties for cleaning in hospital rooms as well as in homes.

*Example 5*

A mixed alkaline salt was prepared from disodium acid phosphate and sodium carbonate. This composition, alone, was a fine heavy duty cleanser. The proportions are not critical. However, for economy, more carbonate may be employed than phosphate. This mixture was compounded with 1 part by weight of the resin particles of Example 1 to 99 parts by weight of the mixture, and its biocidal effectiveness was determined against several organisms by adding the composition to a culture containing 20 million to 30 million organisms per ml. These determinations are summarized in the following table:

| Concentration of resin particles from the composition in culture medium | Percentage Kill Exposure Time in minutes | | | Organism |
| --- | --- | --- | --- | --- |
| | 5 | 10 | 15 | |
| 1 part in 95,000 | 90 | | 100 | Eberthella typhosa. |
| 1 in 95,000 | 66 | 95 | | Pseudomonas aeruginosa. |
| 1 in 95,000 | 75 | 85 | | Bacillus subtillis. |
| 1 in 75,000 | | 100 | | Eberthella typhosa. |

For comparative purposes, similar determinations were conducted with a mixture of sodium carbonate and a minor amount of sodium sulfate, and with a commercial hand soap powder. Both of these contained 1% by weight of the particles of anion exchange resin. The results were:

| Composition | Concentration of resin particles from the composition in culture | Percentage Kill Exposure Time in minutes | | | Organism |
| --- | --- | --- | --- | --- | --- |
| | | 5 | 10 | 15 | |
| Sodium carbonate mixed with sodium sulfate. | 1 in 125,000 | | 90 | | Gram Positive forming organisms similar to Bacillus subtillus and Yeast. |
| Soap powder | 1 in 150,000 | 9.5 | | 99.4 | Eberthella typhosa. |

In order to demonstrate that the biocidal properties of the combination of a basic substance and the particles of anion exchange resin were attributable to the combination rather than to the colloidal resin particles alone, a soluble basic salt powder consisting of disodium acid phosphate was obtained. Separately, particles of anion exchange resin were prepared as in Example 1. The particles of resin were added to a culture of hte organism Staphylococcus aureus. The culture originally had a bacteria count of 20 million to 30 million per ml. The resin particles were added in a sufficient quantity to obtain a suspension of one part of resin in 30,000 parts of water. After 5 minutes, a 5% kill was observed. After 15 minutes' exposure, a 10% kill was obtained. This procedure was then repeated with a separate portion of the same culture. This time, a uniform admixture of the basic phosphate salt with 1% of the resin particles therein was added to the culture, in sufficient amount to obtain a suspension of one part of resin in 30,000 parts of water. After 5 minutes, a kill of 81% was obtained. After 15 minutes, a kill of 99% was obtained. It is thus obvious that the basic buffering salt solution environment is essential in obtaining the biocidal characteristics.

Comparative experiments indicated very little difference, if any, between compositions containing 1% and compositions containing 2% by weight of colloidal particles of the alkali activated anion exchange resin. Limited experiments in which the composition contained as little as one half of one percent by weight of the colloidal particles of the resin also indicated considerable activity, with the slight decrease in activity being a great deal less than that which would be expected by the decreased concentration of the resin particles. There appears to be no upper limit to the proportion of resin particles which may be incorporated to produce a successful germicidal soap mixture, or germicidal detergent. However, practical considerations dictate that the resin content be kept as low as possible, and therefore, contents on the order of 1% to 2% by weight of the composition are preferred.

An outstanding characteristic of the germicidal compositions prepared according to the teaching of this invention is that large kills of organisms are obtained even at extreme dilutions. For example, when the soap prepared in Example 1 was diluted in the ratio of one part by weight of the germicidal soap to 10,000 parts of aqueous medium, a 100% kill was obtained in a five minute period of the approximately 200 billion Staphylococcus aureus organisms in the medium. This kill was made with one gram of the soap composition manufactured according to Example 1. At even greater dilutions, on the order of one part by weight of the germicidal composition to 100,000 parts by weight of the medium, considerable bactericidal activity is in evidence. At dilutions on the order of one part by weight of a medium, kills of between 85% and 100% have been obtained within fifteen minutes on the following types of organisms: Eberthella typhosa; Pseudomonas aeruginosa; Bacillus subtilis; gram positive organisms similar to Bacillus subtilis; Micrococcus pyogenes var. aureus (Staphylococcus aureus); Salomonella typhosa; and Eschericia coli.

In addition to being effective against many types of microorganisms, such as those mentioned above, the germicidal compositions described above have been found effective against forms of fungus. Very good results are obtained against mixed spore suspensions of the following microorganisms:

(1) Aspergillus niger
(2) Aspergillus flavus
(3) Chaetomium globosum
(4) Trichodermi T-1
(5) Penicillium luteum While the preferred form of basic anion exchange resin is one prepared from the condensation of guanidine, urea, and formaldehyde, a great many similar resins may be substituted for that specifically described. It will be readily understood from the description of the killing action in the early part of this specification that the specific type of anion exchange resin employed is not critical since the reaction mechanism remains the same regardless of the particular anion exchanger employed. Thus, when the procedures of Example 1 were followed, with the substitution of several commercially available resins, good germicidal properties in the resulting soaps were observed. For example, a commercially available resin was was purchased from the Permutit Co., under their trademark "De Acidite 515." This is an aliphatic amine anion exchange resin of very high reaction rate. It was incorporated in a soap in the manner described in Example 1, and good germicidal characteristics were observed in the resulting product. The germicidal effectiveness was comparable with, but slightly inferior to, the product obtained in Example 1. Similar results were obtained with a commercially available resin of the American Cyanamid Co., sold under the trademark "Ionac Resin, A2-93M." Excellent results are likewise obtainable with the strongly basic anion exchange resins, such as, for example, the quaternary ammonium salt derivatives of polystyrene crosslinked with divinylbenzene, developed by the Dow Chemical Co. and commercially available under the trademarks "Dowex 1" and "Dowex 2." These resins may be represented by the formula $RR'R''R'''N^+.A^-$, where one R at least is derived from polystyrene.

In general, the anion exchange resin proves increasingly effective with increased basicity, as a component of the compositions herein described, all other factors being held constant. Thus, when the size of the colloidal particles and their proportion by weight of the composition are constant, a more effective kill rate is obtained where a more basic form of a given resin is employed. Such commercially available resins as Permutit A, a resin of medium basicity, and Permutit S, a resin of strong basicity, prove increasingly germicidally effective as their basicity is increased.

While good biocidal activity is exhibited by ordinary commercially available anion exchange resins, in at least one important respect, these resins usually differ from the preferred form of anion exchanger for use in the compositions of this invention. An important desirable characteristic of the anion exchange resin for use in the compositions of this invention is a high rate of exchange. This differs somewhat from the usual desired characteristic for other applications of a high rate per unit volume of resin. Moreover, a usual desired characteristic in exchange resins is an inert, physically strong matrix, which is usually produced by cross-linking in the resin. In contrast, to obtain the highest possible percentage, masswise, of solubilizing, exchangeable polar anion groups, and consequently the highest practicable biocidal activity or rate, the cross-linking should be kept to a minimum. Therefore, although standard commercially available resins do produce good results, it is preferred that the anion exchange resins be specifically prepared to have a high rate of exchange with a minimum of cross-linking, for greatest biocidal efficiency.

Since it is important for all ionic sites in the resin to be accessible for rapid completion of the biocidal reactions, it is important that the resin be in collodial form and that the cross-linking in the resin be at a minimum within the practical limits of stability.

The resins which have been specifically named above should not be construed, in any way, as the only resins which may be employed in the compositions of this invention. On the contrary, other anion exchange resins may be rather freely employed, such as: m-phenylene diamine-formaldehyde resins, polyamine-formaldehyde resins, alkyl and aryl substituted guanidine-formaldehyde resins, alkyl and aryl substituted biguanide-, and guanyl urea-formaldehyde resins, etc., corresponding condensation products of other aldehydes, e.g., acetaldehyde, crotonaldehyde, benzaldehyde, furfural or mixtures of aldehydes may also be employed if desired. The resins such as those prepared from the guanidine, guanyl urea, biguanide, the polyamines, and other materials which do not form substantially insoluble condensation products with formaldehyde for most practical purposes are preferably insolubilized with suitable materials, etc., urea, aminotriazines, especially melamine, the guanamines which react with formaldehyde to produce insoluble products, etc. Furthermore, mixtures of the anion active materials as well as mixtures of the insolubilized materials may be used. Usually it is convenient to employ the salts of the bases such as guanidine but the free bases may also be used. Examples of suitable salts for use in preparation of anion active resins are: guanidine carbonate, guanidine sulfate, biguanide sulfate, biguanide nitrate, guanyl urea sulfate, guanyl urea nitrate, guanyl urea carbonate, etc.

The basic anion exchange resin, in its colloidal state, comprises a vital principle of the biocidal sphere, and offers an optimum large number of accessible reactive hydroxyl ion groups in relation to its mass, causing a very rapid kill through a terminal reaction in which proteolysis is completed.

We claim:
1. A biocidal composition comprising 0.5 to 2% by weight of a basic anion exchange resin having a particle size substantially no larger than 4 microns in diameter and 98 to 99.5% by weight of a basic hydrolyzable salt of an alkali metal and a weak acid selected from the group consisting of phosphoric acid, carbonic acid, higher fatty acids and mixtures thereof.

2. The composition set forth in claim 1 wherein said salt is the sodium salt of fatty acids derived from coconut oil.

3. The composition set forth in claim 1 wherein said salt is the sodium salt of fatty acids derived from tallow.

4. The composition set forth in claim 1 wherein said salt is trisodium phosphate.

5. The composition set forth in claim 1 wherein said salt is a mixture of disodium acid phosphate and sodium carbonate.

6. The method of combatting microorganisms in an aqueous medium comprising admixing with said medium a coposition comprising 0.5 to 2% by weight of a basic anion exchange resin having a particle size substantially no larger than 4 microns in diameter and 98 to 99.5% by weight of a basic hydrolyzable salt of an alkali metal and a weak acid selected from the group consisting of phosphoric acid, carbonic acid, higher fatty acids and mixtures thereof.

References Cited in the file of this patent

UNITED STATES PATENTS

| | | |
|---|---|---|
| 2,156,193 | Puetzer | Apr. 25, 1939 |
| 2,380,877 | Shelton | July 31, 1945 |
| 2,428,329 | Ham | Sept. 30, 1947 |
| 2,501,927 | Block | Mar. 28, 1950 |
| 2,527,099 | Krizkovsky | Oct. 24, 1950 |
| 2,541,248 | Hibbs | Feb. 13, 1951 |
| 2,610,156 | Lundberg | Sept. 9, 1952 |
| 2,656,298 | Lowe | Oct. 20, 1953 |
| 2,684,321 | Thurmon | July 20, 1954 |
| 2,727,007 | Little et al. | Dec. 13, 1955 |
| 2,746,928 | Darragh et al. | May 22, 1956 |

OTHER REFERENCES

Amberlite IRA 400, Rohm and Haas Co., May 1948, 9 pp., part. p. 3.

Mukherjee: J. Indian Chem. Soc., 27:4, April 1950, pp. 156–168.

Amberlite, IRA–400, Lab. Manual, Rohm & Haas Co., Phila., September 1949, 6 pp.

McCulloch: Disinfection and Sterilization, Lea & Febeger, Phila., 2nd Ed. 1945, pp. 249–261, 354–365.

Martin: Gastroenterology, vol. VI, 1946, pp. 315–326.

Chem. and Eng. News, September 26, 1949, inside back cover.

Jindra: J. Pharm. and Pharmacol., vol. I, 1949, pp. 87–94.